US012613020B2

(12) United States Patent
Fischer et al.

(10) Patent No.: US 12,613,020 B2
(45) Date of Patent: Apr. 28, 2026

(54) HEADLIGHTS FOR A MOTOR VEHICLE

(71) Applicant: Hella GmbH & Co. KGaA, Lippstadt (DE)

(72) Inventors: Bernd Fischer, Altenbeken (DE); Tim Frigge, Bochum (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/809,787

(22) Filed: Aug. 20, 2024

(65) Prior Publication Data

US 2025/0067410 A1 Feb. 27, 2025

(30) Foreign Application Priority Data

Aug. 21, 2023 (DE) ........................ 102023122288.0

(51) Int. Cl.

*F21S 41/255* (2018.01)
*F21S 41/143* (2018.01)
*F21S 41/151* (2018.01)
*F21S 41/275* (2018.01)
*F21W 102/135* (2018.01)
*F21W 102/18* (2018.01)

(52) U.S. Cl.

CPC ........... *F21S 41/255* (2018.01); *F21S 41/143* (2018.01); *F21S 41/151* (2018.01); *F21S 41/275* (2018.01); *F21W 2102/135* (2018.01); *F21W 2102/18* (2018.01)

(58) Field of Classification Search

CPC ...... F21S 41/255; F21S 41/143; F21S 41/151; F21S 41/28; F21S 41/2805; F21S 41/275; F21W 2102/135; F21W 2102/18; F21V 5/004; F21V 5/007; F21V 5/008; G02B 3/0037; G02B 3/0043; G02B 3/005

See application file for complete search history.

(56) References Cited

U.S. PATENT DOCUMENTS

2008/0253141 A1* 10/2008 Nakada ................ F21S 41/151 362/507
2016/0169468 A1* 6/2016 Björn .................... F21S 41/141 362/509

(Continued)

FOREIGN PATENT DOCUMENTS

DE 102009020593 A1 11/2010
DE 102011114636 A1 4/2013

(Continued)

*Primary Examiner* — Erin Kryukova
(74) *Attorney, Agent, or Firm* — Husch Blackwell LLP

(57) ABSTRACT

A headlamp for a motor vehicle includes at least one light source, and an optical assembly containing numerous optical components. The optical assembly shapes light from the at least one light source and project it into the area in front of the motor vehicle such that a low beam light distribution is generated by the headlamp. The low beam light distribution has a light/dark boundary and a portion of light for obtaining an OS function above this light/dark boundary. A refractive structure deflects light passing through the refractive structure to obtain the OS function in the area above the light/dark boundary. One of the optical components contains an array of cylindrical lenses. The refractive structure is formed on the optical component that has the array of cylindrical lenses.

12 Claims, 3 Drawing Sheets

(56) References Cited

U.S. PATENT DOCUMENTS

| | | | | |
|---|---|---|---|---|
| 2019/0301699 | A1* | 10/2019 | Fischer ................. | F21S 41/151 |
| 2021/0239290 | A1* | 8/2021 | Fischer ................. | F21S 41/143 |

FOREIGN PATENT DOCUMENTS

| | | | | |
|---|---|---|---|---|
| DE | 102018107213 | A1 | | 10/2019 |
| JP | H0251203 | B2 | * | 11/1990 |
| JP | H11329008 | A | * | 11/1999 |

* cited by examiner

HEADLIGHTS FOR A MOTOR VEHICLE

CROSS REFERENCE

This application claims priority to German Application No. 10 2023 122288.0, filed Aug. 21, 2023, the entirety of which is hereby incorporated by reference.

FIELD OF THE INVENTION

The present invention relates to a headlamp for a motor vehicle.

BACKGROUND OF THE INVENTION

This type of headlamp must satisfy the photometric requirements of the respective licensing division, e.g. ECE, CCC, or SAE. The photometrics that are to be satisfied also include so-called overhead sign values (OS values). These are measurement points lying above the light/dark boundary of the light distribution. This requirement ensures that highway signs placed above the road can be reliably identified and read by the driver.

The light intensities that must be obtained at these measurement points are comparatively low. These measurement points are at high angles. The requirements regarding these measurement points basically contradict the main requirements for low beams, specifically that very little or no light is to be projected into the area above the light/dark boundary. The entire headlamp is basically designed to fulfill this requirement.

DE 10 2009 020 593 A1 discloses a headlamp of the above type. This headlamp has a secondary optical element in the form of a plano-convex lens, which has more than a hundred discrete bumps on its convex surface, with which an OS function is obtained. In addition to the difficulties involved in producing these bumps, and the increased potential for error, the forms added to the projection lens have the disadvantage that they are visible and thus have a negative effect on the outer appearance of the headlamp.

DE 10 2018 107 213 A1 discloses another headlamp. The low beam module in this headlamp contains three light-emitting diodes (LEDs) placed in a horizontal row that emit light when the headlamp is in use. The headlamp also contains three collimator lenses placed in a horizontal row, each of which is dedicated to one of the light sources, such that the light emitted by each light source passes through its dedicated collimator lens. Each of the collimator lenses has an entry surface facing its light source, and an exit surface on the other side. There is an aperture on the entry surface of each collimator lens. The lighting device also has a secondary optical element through which the light exiting the collimator lenses passes. The secondary optical element has a substrate with an array of cylindrical lenses on an entry surface facing the collimator lenses. The projection plane formed by the aperture on the entry surface of each collimator lens extends toward infinity in front of the vehicle. The cylindrical lenses have a vertical orientation resulting in a horizontal spreading of the light distribution.

BRIEF SUMMARY OF THE INVENTION

The fundamental problem addressed by the present invention is the creation of a headlamp of the type described above, the outward appearance of which is not substantially affected by the refractive structure with which the OS function is obtained.

One of the optical components has an array of cylindrical lenses, and the refractive structure is formed on this optical component. By placing the refractive structure on this optical component, it does not have a negative effect on the outer appearance of the headlamp. In particular, this refractive structure can be integrated in the array of cylindrical lenses.

This refractive structure can be a prismatic section of one of the cylindrical lenses, in particular a prismatic section of numerous cylindrical lenses. The refractive structure can also be obtained by tilting these sections in relation to the rest of the cylindrical lenses. A section of at least one, preferably numerous cylindrical lenses is therefore tilted in relation to the plane of the cylindrical lenses. This is practically imperceptible to anyone looking at the it. It can nevertheless deflect light into the area above the light/dark boundary in order to obtain the OS function.

The tilted be section can be tilted in relation to the rest of the cylindrical lens at an angle of 10° to 20°. This angle depends on the angle at which the light exiting the collimator lens strikes the refractive structure.

The cylindrical lenses can be adjacent to one another in a first direction, which is horizontal when the headlamp has been installed in the vehicle, and the axes of the cylindrical lenses can extend in a second direction, which is vertical when the headlamp is installed in the vehicle. Vertical cylindrical lenses result in a horizontal spreading of the light distribution.

The width of the array of cylindrical lenses in the first direction can be greater than the width of refractive structure in this direction, in particular such that the width of the array is at least twice that of the refractive structure in the first direction, preferably more than five times that of the refractive structure in the first direction. The height of the array of cylindrical lenses in the second direction can also be greater than that of the refractive structure in the second direction, in particular more than three times that of the refractive structure, preferably more than ten times that of the refractive structure in the second direction. The refractive structure with which the OS function is obtained is therefore only a small part of the overall surface area of the array of cylindrical lenses. This also results in a refractive structure that has no substantial impact on the outer appearance of the headlamp.

The optical component containing the array of cylindrical lenses can be a transparent substrate that has an entry surface and exit surface for the light from the light sources. The array of cylindrical lenses and the refractive structure with which the OS function is obtained can be on the entry surface of the transparent substrate. Placing the array of cylindrical lenses and therefore the refractive structure on the entry surface also results in a refractive structure that has no substantial impact on the outer appearance of the headlamp.

The exit surface of the transparent substrate can be flat. The flat exit surface supports the horizontal spreading of the light by the cylindrical lenses.

Instead of a being flat, the exit surface can also have an array of lenses.

The optical assembly can comprise a collimator and secondary optical element, in which the collimator contains at least one collimator lens that has an entry surface and an exit surface for the light from the light sources, and the secondary optical element contains the optical component with the array of cylindrical lenses, with the optical assembly being oriented such that the light from the at least one light source passes through the at least one collimator lens, and the light exiting the at least one collimator lens passes through the array of cylindrical lenses. In particular, the headlamp can contain numerous light sources and numerous collimator lenses, and the design of the headlamp can be such that each light source has a dedicated collimator lens, resulting in the light from each of the light sources passing through its dedicated collimator lens.

The headlamp can have at least one aperture located in particular on the entry surface of the at least one collimator lens, or between the at least one light source and the at least one collimator lens. By way of example, the lower edge of each aperture in the optical assembly, formed by the collimator and secondary optical element, can produce the horizontal light/dark boundary in the light distribution in front of the motor vehicle.

The at least one light source can be a light-emitting diode. The at least one light source could also be a laser diode.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Identical or functionally identical parts have the same reference symbols in the figures. A cartesian plane is shown in some of the figures for orientation purposes.

Figure 1:
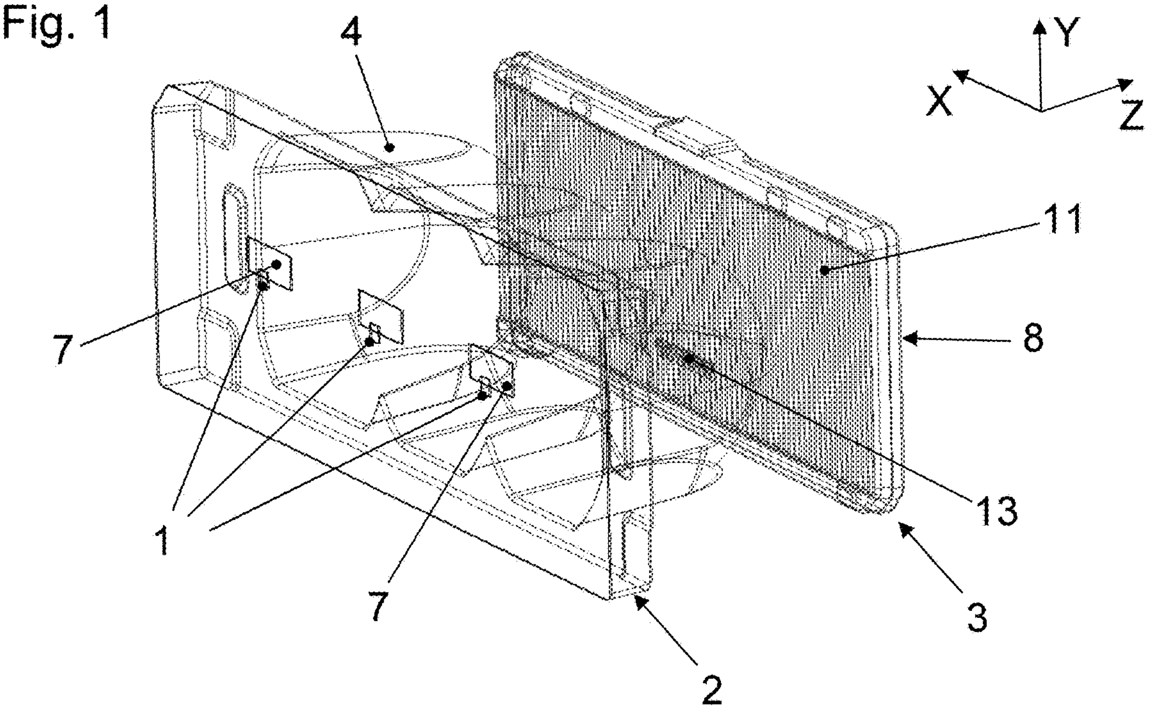
FIG. 1 shows a perspective view of part of the headlamp according to the invention.
Figure 2:
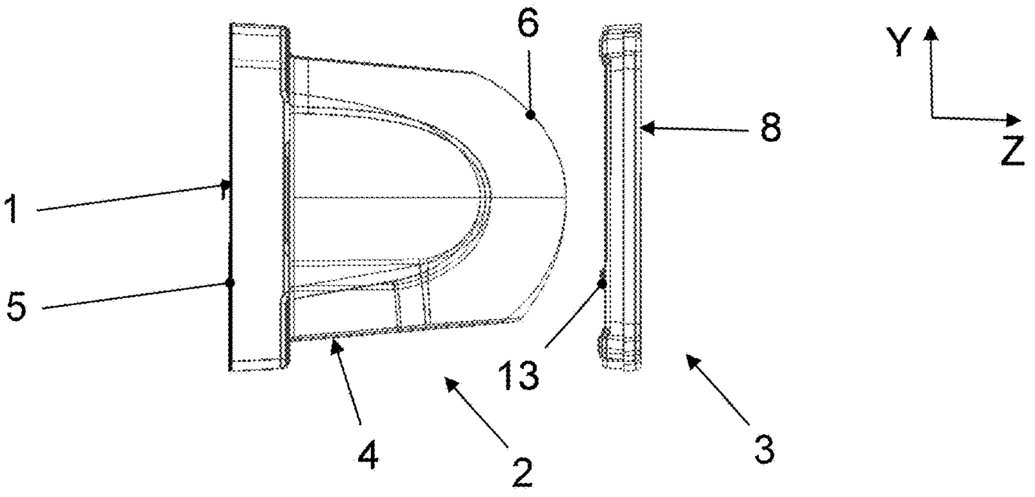
FIG. 2 shows a side view of the part of the headlamp shown in FIG. 1.

The headlamp shown in the figures contains numerous light sources 1, a collimator 2, and a secondary optical element 3 (see FIGS. 1 and 2).

The light sources are formed by light-emitting diodes (LEDs), which emit light when the headlamp is in use. All of the light-emitting diodes can be placed on the same printed circuit board. By way of example, the headlamp in the drawings can contain a row of light-emitting diodes that are spaced apart from one another. There can also be numerous, e.g. two or three, rows of light-emitting diodes that are spaced apart from one another.

The light sources 1 are adjacent to and spaced apart from one another in a first direction X. If there are numerous rows, these rows are adjacent to and spaced apart from one another in a second direction Y, which is perpendicular to the first direction X. Sufficient spacing between the light-emitting diodes has thermal benefits, resulting in an effective cooling of the headlamp.

In particular, the first direction X is horizontal when the headlamp is installed in the vehicle, and the second direction Y is vertical. A third direction Z, which is perpendicular to the first and second directions X, Y, is substantially the direction in which the light from the light sources 1 is propagated (see FIGS. 1 and 2).

The collimator 2 shown in the drawings is an integral structure that is designed such that at least part of the light from the light sources 1 passes through it when the lighting device is in use. In this embodiment, the collimator 2 only has one row of collimator lenses 4, which are adjacent to one another in the first direction X.

If there is more than one row of light sources 1, the collimator 2 also has more than one row of collimator lenses 4. The rows of collimator lenses 4 are then placed above one another in the second direction Y, like the light sources 1.

There can also be more than three or fewer than three collimator lenses 4 in each row.

The collimator lenses 4 each have an entry surface 5 facing the light sources 1 and an exit surface 6 on the other side (see FIG. 2). Each light source 1 has a dedicated collimator lens 4, which is then in front of the light source 1, such that the light from the light sources 1 is substantially collimated by its dedicated collimator lens 4.

The collimator lenses 4 in the collimator 2 do not have to be joined together to form an integral part, but instead can be formed on separate substrates, which can then be adjacent to one another along the first and/or second directions X, Y. The collimator 2 can then be subdivided into columns or rows on numerous substrates.

An aperture 7 is placed on the entry surfaces 5 of each of the collimator lenses 4 between the light sources 1 and their dedicated collimator lenses 4 (see FIG. 1). The aperture 7 is formed as a hole in an opaque layer placed on the entry surface 5. This opaque layer can be formed by sputtering or applying a lacquer to the entry surface 5, and the hole can be formed with a laser beam that cuts through the opaque layer.

The aperture 7 does not have to be formed directly on the entry surface, but can be a separate element placed between the light source 1 and the entry surface 5.

The lower edges of the apertures 7 on the entry surfaces 5 of the collimator lenses 4 (see FIG. 1) can produce the horizontal light/dark boundary in the light distribution in front of the vehicle obtained with the collimator 2 and secondary optical element 3 that form the optical assembly for the headlamp.

The secondary optical element 3 contains an optical component 8 formed by an at least partially transparent substrate. The secondary optical element 3 can also contain more than one optical component.

Figure 4:
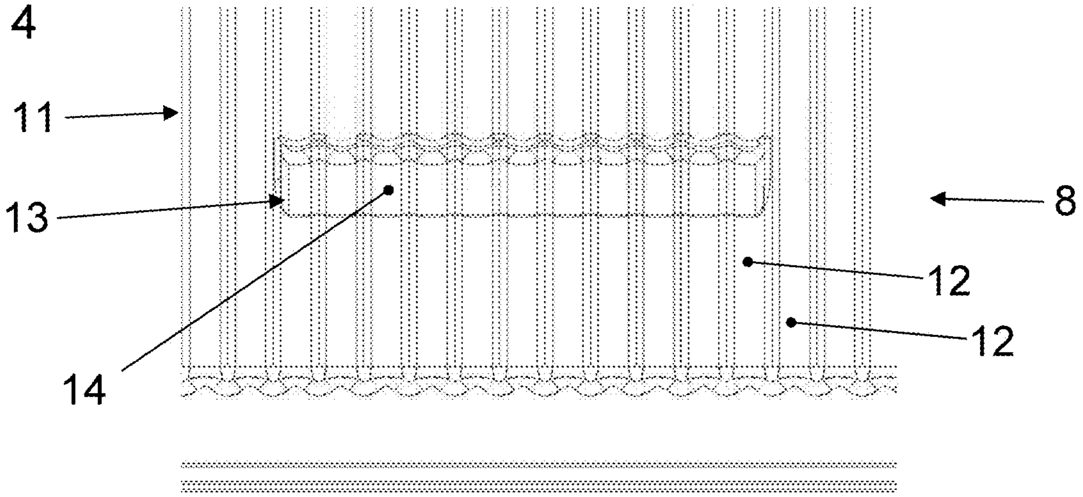
FIG. 4 shows a detail of the entry surface shown in FIG. 3.
Figure 5:
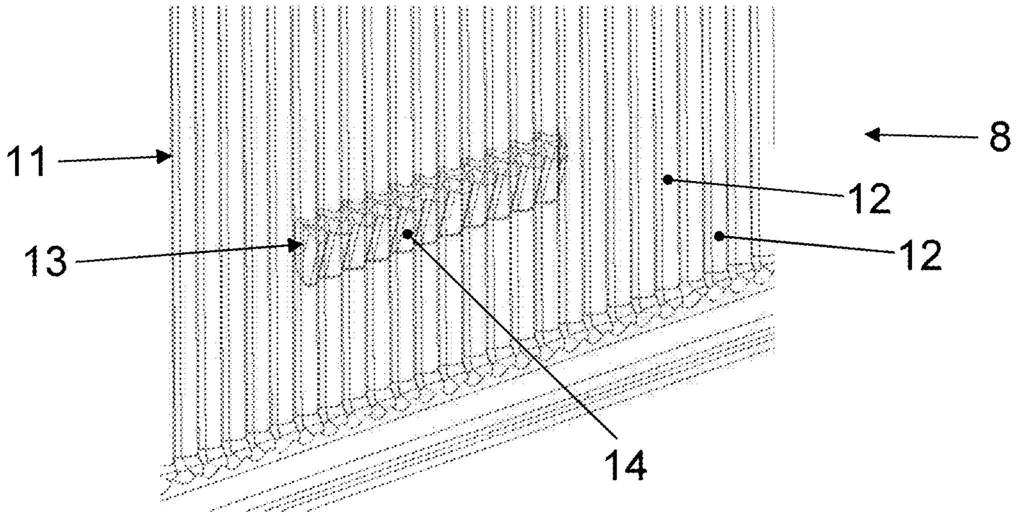
FIG. 5 shows a perspective view of the detail of the entry surface shown in FIG. 3.

The optical component 8 has an entry surface 9 facing the collimator 2, and an exit surface 10 on the other side. The optical component 8 has an array 11 of cylindrical lenses 12 on the entry surface 9, which are adjacent to one another in the first direction X (see FIGS. 3 to 5). The axes of the cylindrical lenses 12 extend in the Y direction. The exit surface 10 of the substrate is flat. The exit surface does not have to be flat, and instead can also have an array of lenses.

When the headlamp is in use, at least a portion of the light emitted through the collimator 2 passes through the array 11 of cylindrical lenses 12 and the flat exit surface 10 and then spreads out along the first direction X, or horizontally.

Figure 3:
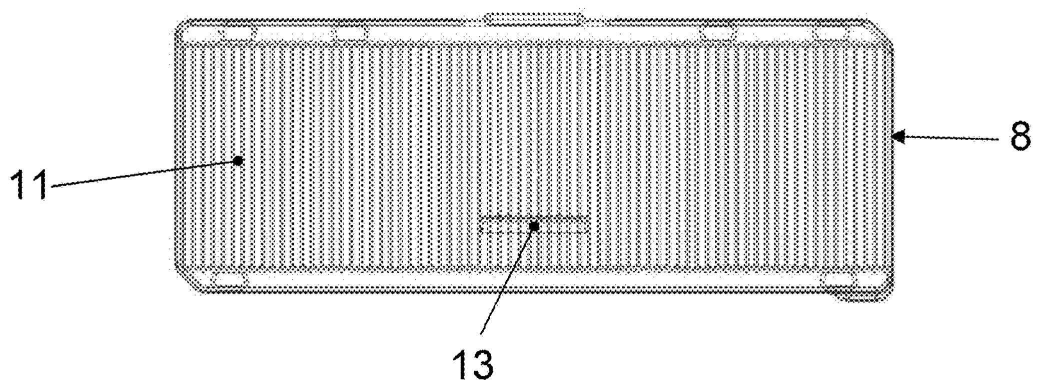
FIG. 3 shows the entry surface of the component of the headlamp that has the array of cylindrical lenses shown in FIG. 1 from above.
Figure 7:
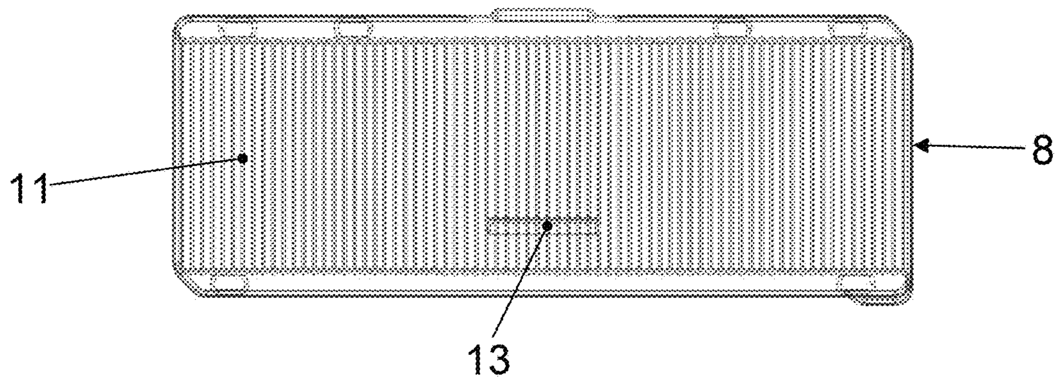
FIG. 7 shows the exit surface of the component of the headlamp shown in FIG. 1 that has the array of cylindrical lenses from above.

The optical component 8 also has a refractive structure 13 on the entry surface 9, which is integrated in the array 11 of cylindrical lenses 12. This refractive structure 13 is formed by prismatic sections 14 of numerous adjacent cylindrical lenses 12. FIGS. 3 and 7 show that the refractive structure 13 for obtaining the OS function only occupies a small part of the surface area of the array 11 of cylindrical lenses 12. Consequently, the refractive structure 13 has no substantial impact on the external appearance of the headlamp.

Figure 6:
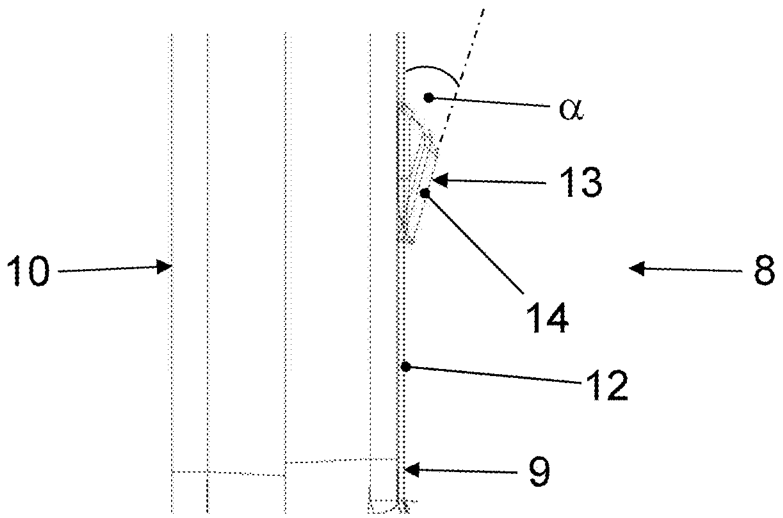
FIG. 6 shows a detail of a side view of the component of the headlamp shown in FIG. 1 that has the array of cylindrical lenses.

The sections 14 of the cylindrical lenses 12 forming the refractive structure 13 are tilted in relation to the rest of the sections 15 of the cylindrical lenses 12, such that they tilt away from the plane of the cylindrical lenses 12 (see FIG. 6). The angle α between the at least one tilted section 14 and the sections of the cylindrical lenses 12 that are not tilted can be between 10° and 20° (see FIG. 6).

Part of the light exiting the collimator 2 can be deflected by the tilted section 14 of the refractive structure 13 into the area above the light/dark boundary in order to obtain the OS function.

Figure 8:
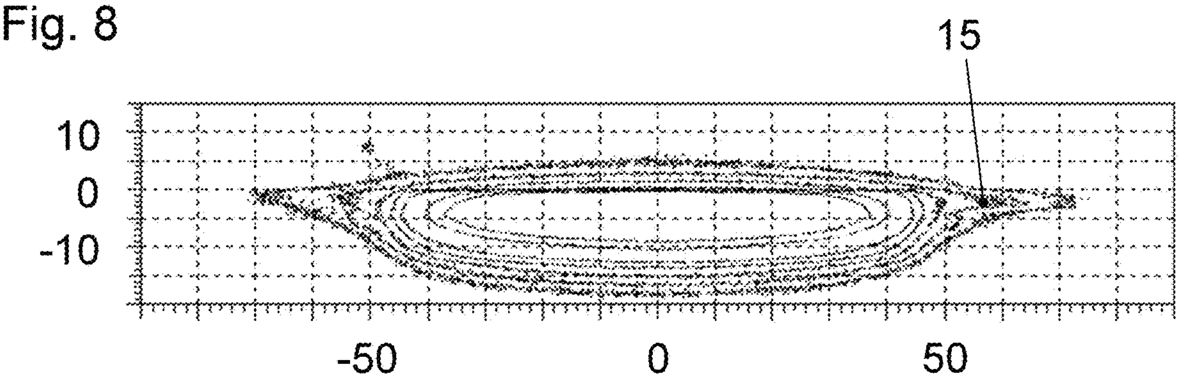
FIG. 8 shows a low beam light distribution in which the angles along both axes are given in degrees, in which a low beam light distribution is generated by a headlamp not according to the invention, which does not generate an OS function.
Figure 9:
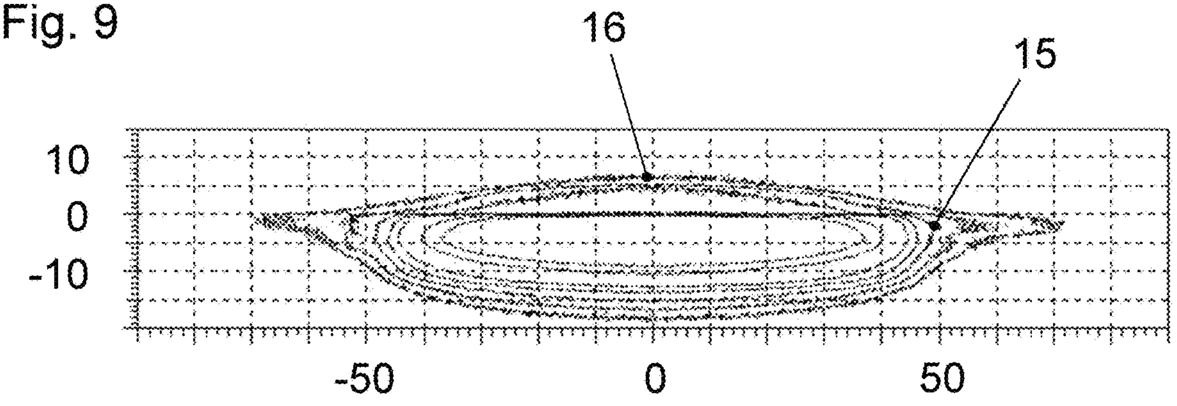
FIG. 9 shows a low beam light distribution generated by the headlamp according to the invention shown in FIGS. 1 and 2, in which the angles along both axes are given in degrees.

FIG. 9 shows a low beam light distribution 15 obtained with the embodiment of the headlamp illustrated herein, which has the OS value 16 in a central part at vertical angles between 5° and 10°. FIG. 8 shows a low beam light distribution generated by a headlamp without the refractive structure 13. There are no OS values in this case.

LIST OF REFERENCE SYMBOLS

- 1 light source
- 2 collimator
- 3 secondary optical element
- 4 collimator lens
- 5 entry surface of the collimator lens
- 6 exit surface of the collimator lens
- 7 aperture
- 8 optical component of the secondary optical element
- 9 entry surface of the optical component
- 10 exit surface of the optical component
- 11 array of cylindrical lenses
- 12 cylindrical lenses in the array
- 13 refractive structure 13
- 14 tilted section of the cylindrical lenses
- 15 low beam light distribution
- 16 OS value for the low beam light distribution
- α angle between the tilted section and the section of the cylindrical lenses that is not tilted

The invention claimed is:

1. A headlamp for a motor vehicle, the headlamp comprising:

at least one light source that emits light when the headlamp is in use;

an optical element containing at least one optical component, the optical element configured to shape the light from the at least one light source and project the light from the at least one light source into an area in front of the motor vehicle such that a low beam light distribution is generated by the headlamp, the low beam light distribution having a light/dark boundary and a portion of light for obtaining an overhead sign (OS) function above this light/dark boundary, the at least one optical component further comprising:

an array of cylindrical lenses; and a refractive structure configured to deflect light passing through the refractive structure to obtain the OS function in the area above the light/dark boundary;

wherein the refractive structure is integrated in the array of cylindrical lenses.

2. The headlamp according to claim 1, wherein the refractive structure is formed by a prismatic section of at least one of the cylindrical lenses.

3. The headlamp according to claim 1, wherein the refractive structure is formed by tilting a section of at least one of the cylindrical lenses in relation to the rest of the cylindrical lenses.

4. The headlamp according to claim 3, wherein the angle (α) between the at least one tilted section and the sections of the cylindrical lenses that are not tilted is between 10° and 20°.

5. The headlamp according to claim 1, wherein the at least one light source is a light-emitting diode.

6. A headlamp for a motor vehicle, the headlamp comprising:

at least one light source that emits light when the headlamp is in use;

an optical element containing at least one optical component, the optical element configured to shape the light from the at least one light source and project the light from the at least one light source into an area in front of the motor vehicle such that a low beam light distribution is generated by the headlamp, the low beam light distribution having a light/dark boundary and a portion of light for obtaining an overhead sign (OS) function above this light/dark boundary, the at least one optical component further comprising:

an array of cylindrical lenses; and a refractive structure configured to deflect light passing through the refractive structure to obtain the OS function in the area above the light/dark boundary;

wherein the cylindrical lenses in the array of cylindrical lenses are adjacent to one another in a first direction (X), which is horizontal when the headlamp is installed in the vehicle, and the axes of the cylindrical lenses extend in a second direction (Y), which is vertical when the headlamp is installed in the vehicle.

7. The headlamp according to claim 6, wherein a width of the array of cylindrical lenses is greater than that of the refractive structure in the first direction (X).

8. The headlamp according to claim 6, wherein a height of the array of cylindrical lenses is greater than that of the refractive structure in the second direction (Y).

9. A headlamp for a motor vehicle, the headlamp comprising:

at least one light source that emits light when the headlamp is in use;

an optical element containing at least one optical component, the optical element configured to shape the light from the at least one light source and project the light from the at least one light source into an area in front of the motor vehicle such that a low beam light distribution is generated by the headlamp, the low beam light distribution having a light/dark boundary and a portion of light for obtaining an overhead sign (OS) function above this light/dark boundary, the at least one optical component further comprising:

an array of cylindrical lenses; and a refractive structure configured to deflect light passing through the refractive structure to obtain the OS function in the area above the light/dark boundary;

wherein the at least one optical component is a transparent substrate with an entry surface and an exit surface for the light from the light sources;

wherein the array of cylindrical lenses and the refractive structure for obtaining the OS function are placed on the entry surface of the transparent substrate; and wherein the exit surface of the transparent is flat.

10. A headlamp for a motor vehicle, the headlamp comprising:

at least one light source that emits light when the headlamp is in use;

an optical element containing at least one optical component, the optical element configured to shape the light from the at least one light source and project the light from the at least one light source into an area in front of the motor vehicle such that a low beam light distribution is generated by the headlamp, the low beam light distribution having a light/dark boundary and a portion of light for obtaining an overhead sign (OS) function above this light/dark boundary, the at least one optical component further comprising:

an array of cylindrical lenses; and a refractive structure configured to deflect light passing through the refractive structure to obtain the OS function in the area above the light/dark boundary;

wherein: the headlamp further comprises a collimator including at least one collimator lens with an entry surface and an exit surface for the light from the light source, the optical element further comprises a second optical element, and the light from the at least one light source passes through the at least one collimator lens and the light exiting the at least one collimator lens passes through the array of cylindrical lenses.

11. The headlamp according to claim 10, wherein the headlamp comprises numerous light sources and numerous collimator lenses, wherein each light source has a dedicated collimator lens, resulting in the light from the light sources passing through their dedicated collimator lenses.

12. The headlamp according to claim 10, wherein the headlamp has at least one aperture positioned on the entry surface of the at least one collimator lens or between the at least one light source and the at least one collimator lens.

* * * * *